United States Patent
Qureshi

[11] Patent Number: 6,144,851
[45] Date of Patent: *Nov. 7, 2000

[54] METHOD AND APPARATUS FOR SERVING CELL CODE ASSIGNMENT

[75] Inventor: Rauf A. Qureshi, Greenville, S.C.

[73] Assignee: AT&T Wireless Services Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/792,363

[22] Filed: Jan. 31, 1997

[51] Int. Cl.[7] ............................................. H04B 7/00

[52] U.S. Cl. .............................................. 455/422; 455/450

[58] Field of Search ................................... 455/422, 432, 455/436, 446, 447, 450, 452, 453, 509

[56] References Cited

U.S. PATENT DOCUMENTS

| | | | |
|---|---|---|---|
| 4,384,362 | 5/1983 | Leland | 455/33 |
| 4,670,899 | 6/1987 | Brody | 379/60 |
| 5,230,082 | 7/1993 | Ghisler et al. | 455/33.2 |
| 5,363,428 | 11/1994 | Nagashima | 379/58 |
| 5,465,390 | 11/1995 | Cohen | 455/33.4 |
| 5,517,673 | 5/1996 | Fehnel | 455/434 |
| 5,613,205 | 3/1997 | Dufour | 455/440 |
| 5,758,287 | 5/1998 | Lee et al. | 455/450 |

Primary Examiner—Thanh Cong Le

[57] ABSTRACT

Serving cell codes, such as group color codes, are automatically assigned to serving cells in a cellular communications network. For serving cells which share a frequency, the serving cell codes generally indicate distance from an arbitrarily chosen initial serving cell. When a new serving cell is added, only serving cells sharing the channel group associated with the new serving cell need be considered, and the serving cell codes for the remainder of the serving cells are unchanged.

37 Claims, 7 Drawing Sheets

| CHANNEL GROUP | Z |
|---|---|
| A1 | 1 |
| A2 | 2 |
| A3 | 3 |
| B1 | 4 |
| B2 | 5 |
| B3 | 6 |
| C1 | 7 |
| C2 | 8 |
| C3 | 9 |
| D1 | 10 |
| D2 | 11 |
| D3 | 12 |
| E1 | 13 |
| E2 | 14 |
| E3 | 15 |
| F1 | 16 |
| F2 | 17 |
| F3 | 18 |
| G1 | 19 |
| G2 | 20 |
| G3 | 21 |

FIG. 3

| SERVING CELL | CHANNEL GROUP | HANDOFF OR NEIGHBOR CELLS |
|---|---|---|
| 0 | D2 | 1,3,4 |
| 1 | B3 | 0,2A,2C,5,4 |
| 2A | G1 | 1,2B,2C,5 |
| 2B | G2 | 2A,2C,6B |
| 2C | G3 | 2A,2B,6B,6A,5,1 |
| 3 | G2 | 0,4,7 |
| 4 | A2 | 0,1,5,8,7,3 |
| 5 | A3 | 1,2A,2C,6A,6C,9B,9A,8,4 |
| 6A | D1 | 2C,6B,6C,9B,9A,5 |
| 6B | D2 | 2C,6A,6C |
| 6C | D3 | 5,6A,6B,9B,9A |
| 7 | A1 | 3,4,8 |
| 8 | G2 | 7,4,5,9A,9C |
| 9A | B1 | 9B,9C,8,5,6A,6C |
| 9B | B2 | 9C,9A,5,6A,6C |
| 9C | B3 | 8,9A,9B |

| | INITIALLY | AFTER FIRST S108 | AFTER SECOND S108 | AFTER THIRD S108 | |
|---|---|---|---|---|---|
| GROUP(1) | 0 | 0 | 0 | 1 | |
| GROUP(2) | 0 | 0 | 1 | 1 | |
| GROUP(3) | 0 | 0 | 0 | 1 | |
| GROUP(4) | 0 | 0 | 0 | 0 | |
| GROUP(5) | 0 | 0 | 0 | 0 | |
| GROUP(6) | 0 | 0 | 1 | 1 | |
| GROUP(7) | 0 | 0 | 0 | 0 | |
| GROUP(8) | 0 | 0 | 0 | 0 | |
| GROUP(9) | 0 | 0 | 0 | 0 | |
| GROUP(10) | 0 | 0 | 0 | 0 | |
| GROUP(11) | 0 | 1 | 1 | 1 | |
| GROUP(12) | 0 | 0 | 0 | 0 | |
| GROUP(13) | 0 | 0 | 0 | 0 | |
| GROUP(14) | 0 | 0 | 0 | 0 | |
| GROUP(15) | 0 | 0 | 0 | 0 | |
| GROUP(16) | 0 | 0 | 0 | 0 | |
| GROUP(17) | 0 | 0 | 0 | 0 | |
| GROUP(18) | 0 | 0 | 0 | 0 | |
| GROUP(19) | 0 | 0 | 0 | 1 | |
| GROUP(20) | 0 | 0 | 1 | 2 | |
| GROUP(21) | 0 | 0 | 0 | 1 | |
| TEMP_CELL_COUNT | 0 | 1 | 4 | 9 | |
| XARRAY | 0 | 1,3,4 | 2A,2C,5,7,8 | 2B,6A,6B,6C, 9B,9A,9C | |
| X1ARRAY | | 1,3,4 | 0,2A,2C,4,5 0,4,7 0,1,5,8,7,3 | 1,2B,2C,5; 2A,2B,6A,6B,1,5; 1,2A,2C,6A,6C,9B,9A 8,4; 3,4,8; 7,4,5,9A,9C; | |
| OUTFILE | | 0 \| 0  SERVING CELL / GCC | 0 \| 0  1 \| 0  3 \| 0  4 \| 0 | 0 \| 0  1 \| 0  3 \| 0  4 \| 0  2A \| 0  2C \| 0  5 \| 0  7 \| 0  8 \| 1 | |

FIG. 5B

| | AFTER FOURTH S108 | |
|---|---|---|
| GROUP(1) | 1 | |
| GROUP(2) | 1 | |
| GROUP(3) | 1 | |
| GROUP(4) | 1 | |
| GROUP(5) | 1 | |
| GROUP(6) | 2 | |
| GROUP(7) | 0 | |
| GROUP(8) | 0 | |
| GROUP(9) | 0 | |
| GROUP(10) | 1 | |
| GROUP(11) | 2 | |
| GROUP(12) | 1 | |
| GROUP(13) | 0 | |
| GROUP(14) | 0 | |
| GROUP(15) | 0 | |
| GROUP(16) | 0 | |
| GROUP(17) | 0 | |
| GROUP(18) | 0 | |
| GROUP(19) | 1 | |
| GROUP(20) | 3 | |
| GROUP(21) | 1 | |
| TEMP_CELL_COUNT | 16 | |
| XARRAY | DON'T CARE | |
| X1ARRAY | DON'T CARE | |
| OUTFILE | 0 | 0 |
| | 1 | 0 |
| | 3 | 0 |
| | 4 | 0 |
| | 2A | 0 |
| | 2C | 0 |
| | 5 | 0 |
| | 7 | 0 |
| | 8 | 1 |
| | 2B | 2 |
| | 6A | 0 |
| | 6B | 1 |
| | 6C | 0 |
| | 9B | 0 |
| | 9A | 0 |
| | 9C | 1 |

FIG. 6

FIG. 7

METHOD AND APPARATUS FOR SERVING CELL CODE ASSIGNMENT

BACKGROUND OF THE INVENTION

The present invention relates in general to cellular communication networks and, more particularly, to a method and apparatus for assigning serving cell codes to cell sites within the network.

In a wireless cellular communication network, each cell site is assigned a group of radio frequency (RF) channels which may be used for communicating with mobile stations. However, due to the increasing popularity of wireless communications, RF channels must be reused among many different cell sites in order to accommodate users in high-traffic, population-dense areas, such as big cities.

The reuse of RF channels among the cell sites is determined according to a frequency reuse plan, which provides that cell sites that share a common channel or channel group must be sufficiently separated such that co-channel interference is kept at an acceptable level. In such a system, a mobile station operating on a particular channel may receive interfering signals on that channel from the co-channel site, and the mobile station needs to be able to distinguish between the serving channel and the interfering channel.

To deal with the co-channel interference problem, each cell site is assigned a serving cell code so that a mobile station can distinguish between a signal received from the serving cell site and an interfering signal received from a co-channel site, by using the serving cell codes. Thus, if two co-channel cell sites are close enough so that a mobile station might receive signals from both cell sites, then the cell sites must be assigned different serving cell codes.

A shortcoming of assigning serving cell codes is that the range of serving cell codes is usually limited. For example, for cellular digital packet data (CDPD), as defined in "Cellular Digital Packet Data System Specification," Release 1.0, Jul. 19, 1993, a group code color (GCC) is an example of a serving cell code, but only 32 group color codes are available. Thus, GCCs must not only be reused, but they may only be reused for co-channel sites if the cell sites are sufficiently spaced apart in a manner such that there is minimal co-channel interference between them. Presently, GCC assignment is performed manually by visually determining that two co-channel sites sharing the same GCC are far enough apart while referring to a site map of all of the cell sites that need to be assigned GCCs. However, manually assigning GCCs is extremely inefficient because it requires a significant amount of time and labor.

SUMMARY OF THE INVENTION

The present invention provides a method and an apparatus for automatically assigning a serving cell code to an initial serving cell in a communications network based on a channel group associated with the initial serving cell.

A serving cell code is automatically assigned to a next serving cell based on the channel groups associated with the next serving cell and the initial serving cell.

Serving cell codes are automatically assigned to subsequent serving cells sharing the channel group associated with the initial serving cell generally based on the distance from the subsequent serving cells to the initial serving cell.

In one embodiment, a cellular switch automatically assigns the cell codes to the serving cells.

In another embodiment, a server located at a location other than a cellular switch automatically assigns the cell codes to the serving cells.

Also in accordance with the present invention, a method and apparatus are provided for assigning a new serving cell code to a new serving cell in a communication network having existing serving cells with previously assigned serving cell codes, each of the new serving cell and the existing serving cells having an associated channel group. The existing serving cells sharing the channel group associated with the new serving cell are read from a memory, and the new serving cell code is automatically assigned to the new serving cell based on the previously assigned serving cell codes for the existing serving cells sharing the channel group associated with the new serving cell.

It is not intended that the invention be summarizd here in its entirety. Rather, further features, aspects and advantages of the invention are set forth in or are apparent from, the following description and drawings.

BRIEF DESCRIPTION OF THE DRAWINGS

The foregoing features and other aspects of the invention are explained in the following description taken in connection with the accompanying drawings, wherein.

DETAILED DESCRIPTION

According to the inventive technique, cells which share a transmission frequency are automatically assigned different serving cell codes so that a receiver, such as a cellular telephone, can readily determine the source of the transmission. Preferably, the values of the serving cell codes increase with distance from an arbitrarily chosen initial cell, so that if the range of serving cell codes is limited (requiring re-use of serving cell codes), serving cells with the same serving cell code are sufficiently far apart that there is no possibility of confusion at a mobile station receiving transmissions from different serving cells on the same transmission frequency.

Figure 1:
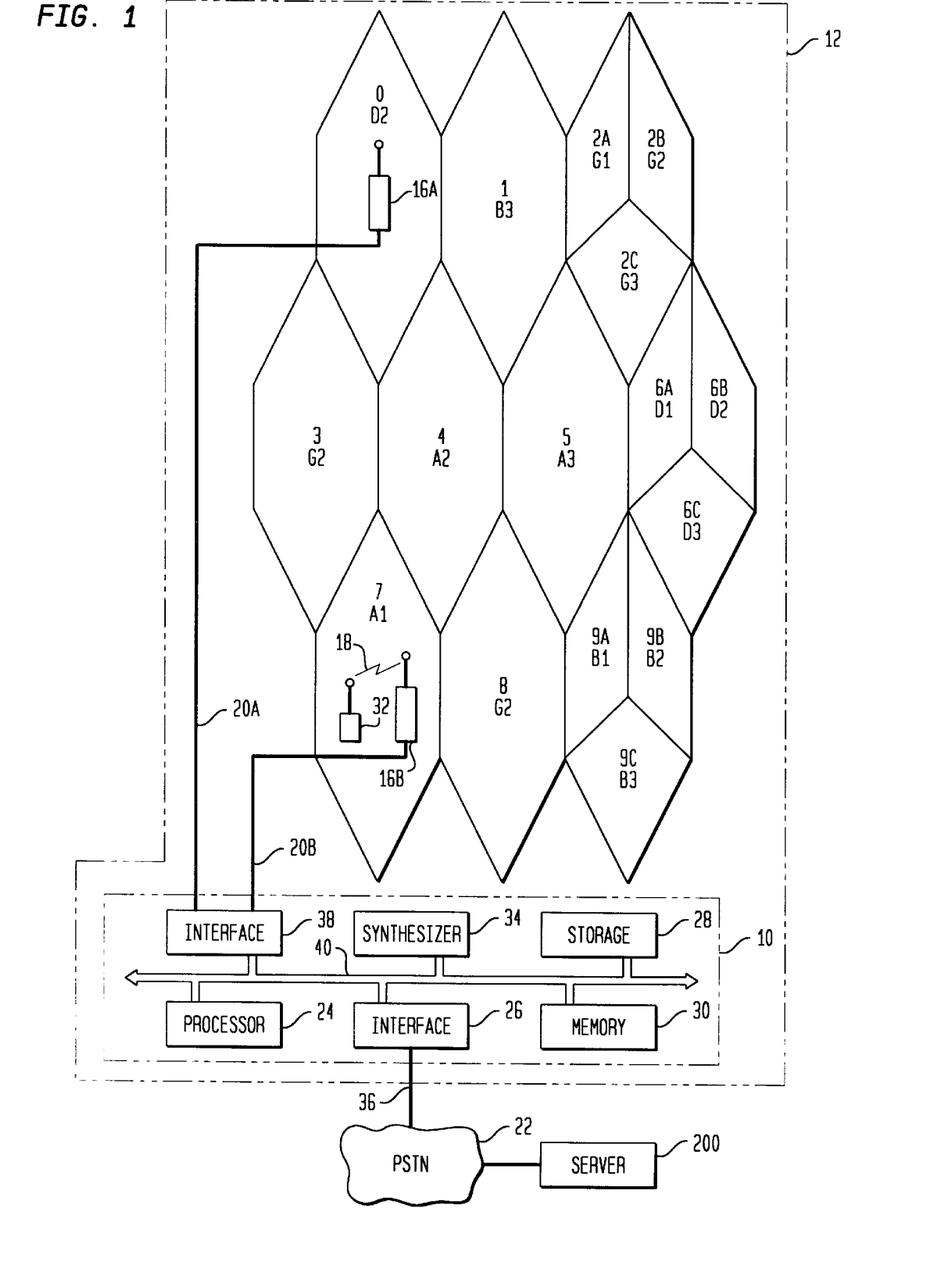
FIG. 1 is a diagram of an environment in which the present invention is applied.

FIG. 1 illustrates a cellular communication network 12 in which the inventive technique is utilized. FIG. 1 shows generally a cellular switch, commonly referred to as a mobile switching center (MSC) 10, public switched telephone network (PSTN) 22, cells 0–9, and mobile station 32. FIG. 1 also shows server 200 coupled to PSTN 22; server 200 is absent from some embodiments.

Although a typical cellular communication network may have any number of cells, FIG. 1 illustrates ten representative cells 0–9 of the cellular communication network 12.

Cells 0, 1, 3–5, 7 and 8 each have a base station system situated in the vicinity of the center of the cell with an omni-directional antenna; these cells are typically referred to as omni-cells. Cells 0 and 7 are shown as having base station systems 16A, 16B, respectively. The base stations of other cells are omitted from FIG. 1 for clarity of illustration. Base station systems 16A and 16B are connected to interface 38 of MSC 10 by cables 20A and 20B, respectively. Mobile station 32 is shown as communicating with base station system 16B by means of a radio link 18.

Cells 2, 6 and 9 each have a base station system situated in the vicinity of the center of the cell with three directional antennas centered at 0 degrees, 120 degrees and 240 degrees; these cells are typically referred to as sectored cells, with respective sectors A, B and C.

For purposes of the present inventive technique, each of an omni-cell and the sectors of a sectored cell are eligible to be a serving cell. Consequently, for the environment shown in FIG. 1, the serving cells are:

0, 1, 2A, 2B, 2C, 3, 4, 5, 6A, 6B, 6C, 7, 8, 9A, 9B, 9C

MSC 10 is used for switching calls involving at least one mobile station 32, system processing, and interconnecting base station systems 16A and 16B with PSTN 22. MSC 10 comprises processor 24, PSTN communications interface 26, wireless communications interface 38, storage 28 for storing data records, memory 30 for holding data records currently in use by MSC 10, and transmitting frequency synthesizer 34, all interconnected by bus 40. PSTN interface 26 of MSC 10 is connected by cable 36 to PSTN 22 for communicating with land-based stations (not shown). A typical wireless communications network consists of many MSCs coupled to PSTN 22, with each MSC able to communicate with a plurality of cells.

Each of the serving cells has a channel group associated therewith. As used herein and in the claims, a channel group is a collection of one or more RF channels. There are typically 21 different Channel Groups, designated as:

A1, A2, A3, B1, B2, B3, C1, C2, C3, D1, D2, D3, E1, E2, E3, F1, F2, F3, G1, G2, G3.

Figure 2:
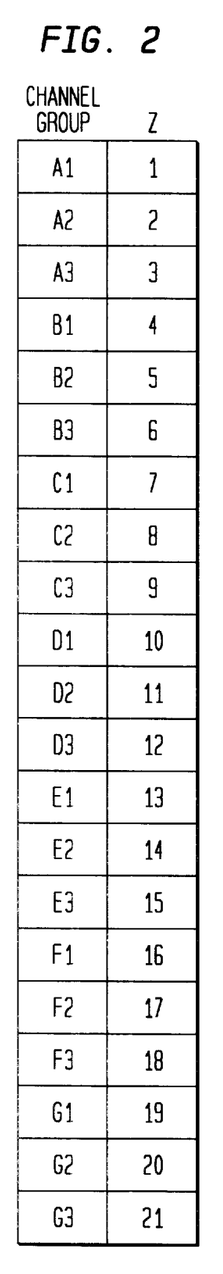
FIG. 2 is a chart depicting channel groups and their assigned numerical values.

As shown in FIG. 2, each channel group has a corresponding numerical value, that is, Channel Group A1 corresponds to "1", Channel Group A2 corresponds to "2", . . . , Channel Group G2 corresponds to "20" and Channel Group G3 corresponds to "21". Each RF channel within a Channel Group is typically 21 channels apart from adjacent channels in the Channel Group. For example, Channel Group A1 contains RF channels 1, 22, 43, . . . , and Channel Group A2 contains RF channels 2, 23, 44, . . . . Different sets of channels must always be allocated to neighboring cells, since in order to maintain full radio coverage, cells will often overlap one another. If there are over 21 cells in the system, which is typically the case, the Channel Groups are reused. The reuse of channel groups among cells is determined according to a frequency reuse plan, which provides that cells sharing a channel group must be sufficiently separated so that co-channel interference is kept at an acceptable level.

Figure 3:
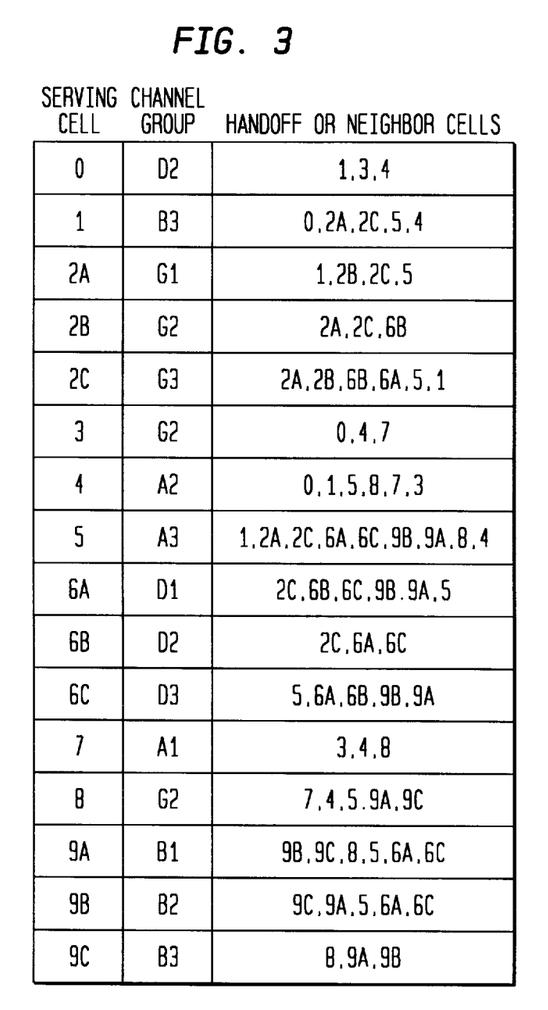
FIG. 3 is a chart providing information for the cells shown in FIG. 1.

In FIG. 1, directly underneath the reference numeral for each of the serving cells is its associated channel group. FIG. 3 is a table showing, for each serving cell, its associated channel group and its adjacent serving cells, sometimes referred to as neighbor serving cells or handoff serving cells. As mobile station 32 roams from a serving cell, it is handed off from the base station of the serving cell to the base station of one of the neighbor serving cells.

Figure 4:
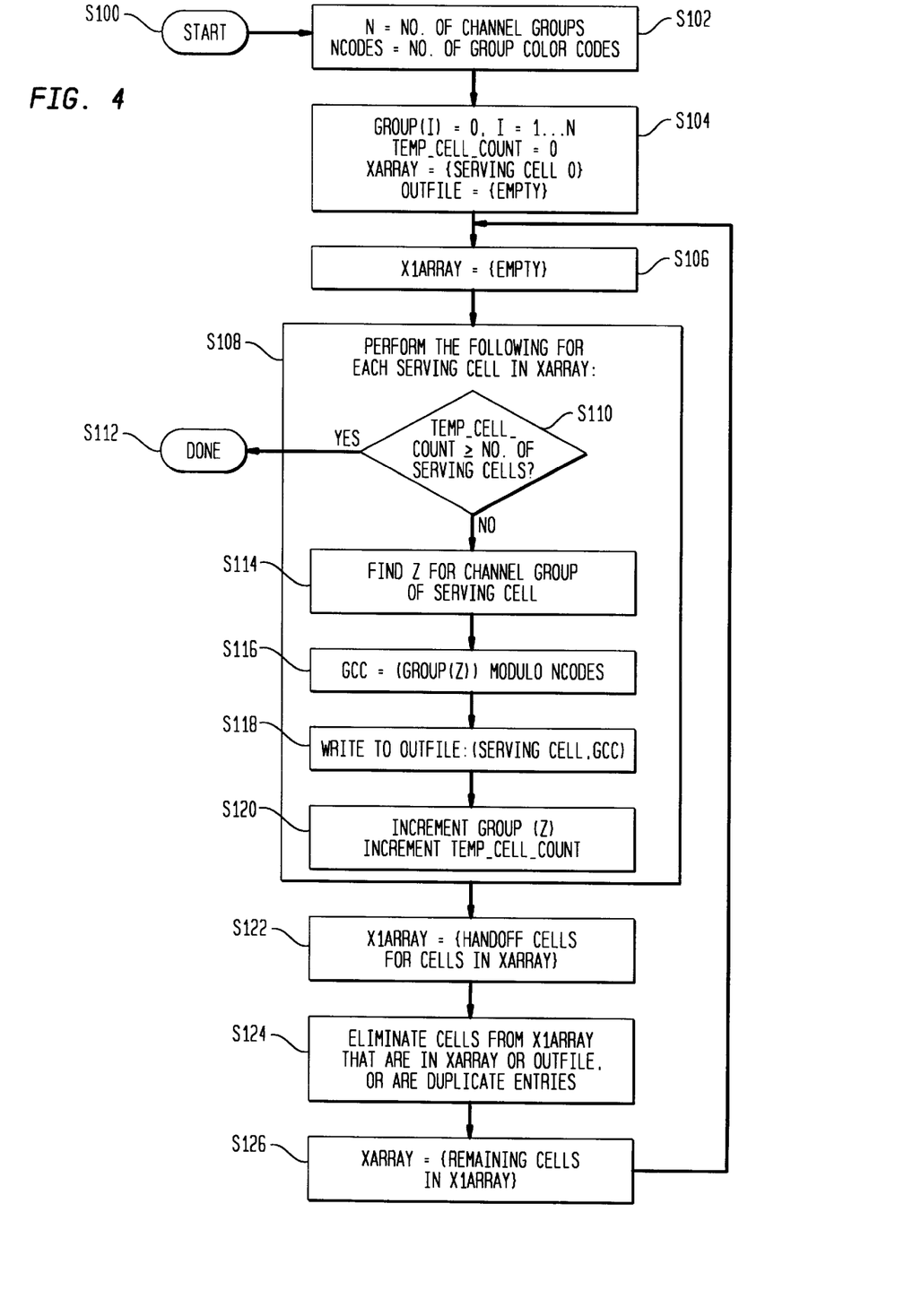
FIG. 4 is a flowchart illustrating automatic assignment of serving cell codes.
Figure 5A:
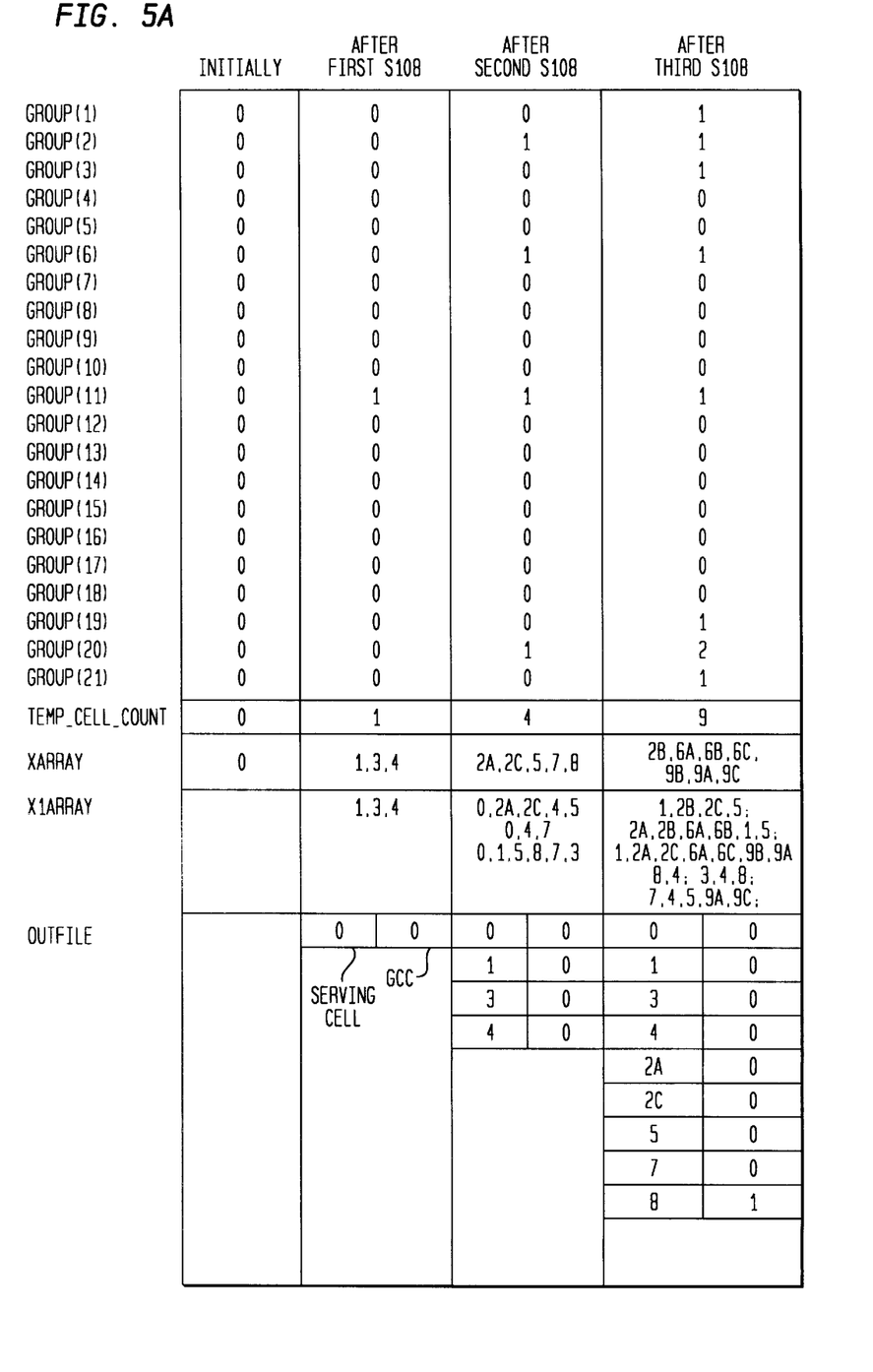
FIGS. 5A and 5B, read together, show data structures used in an exemplary application of the method of FIG. 4.
Figure 5B:
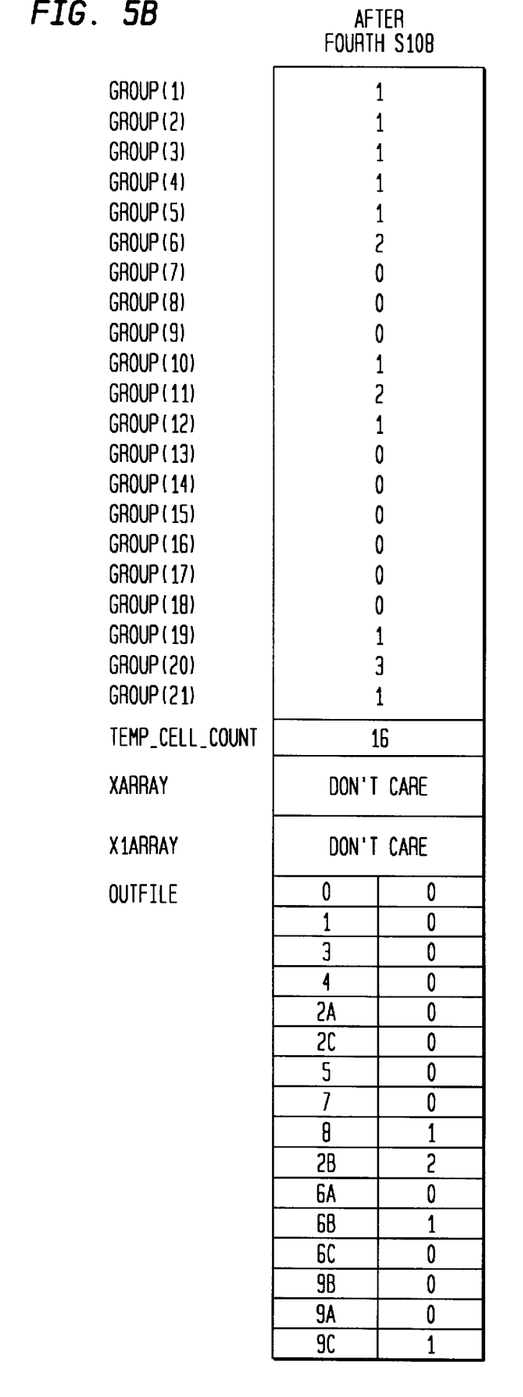
Figure 6:
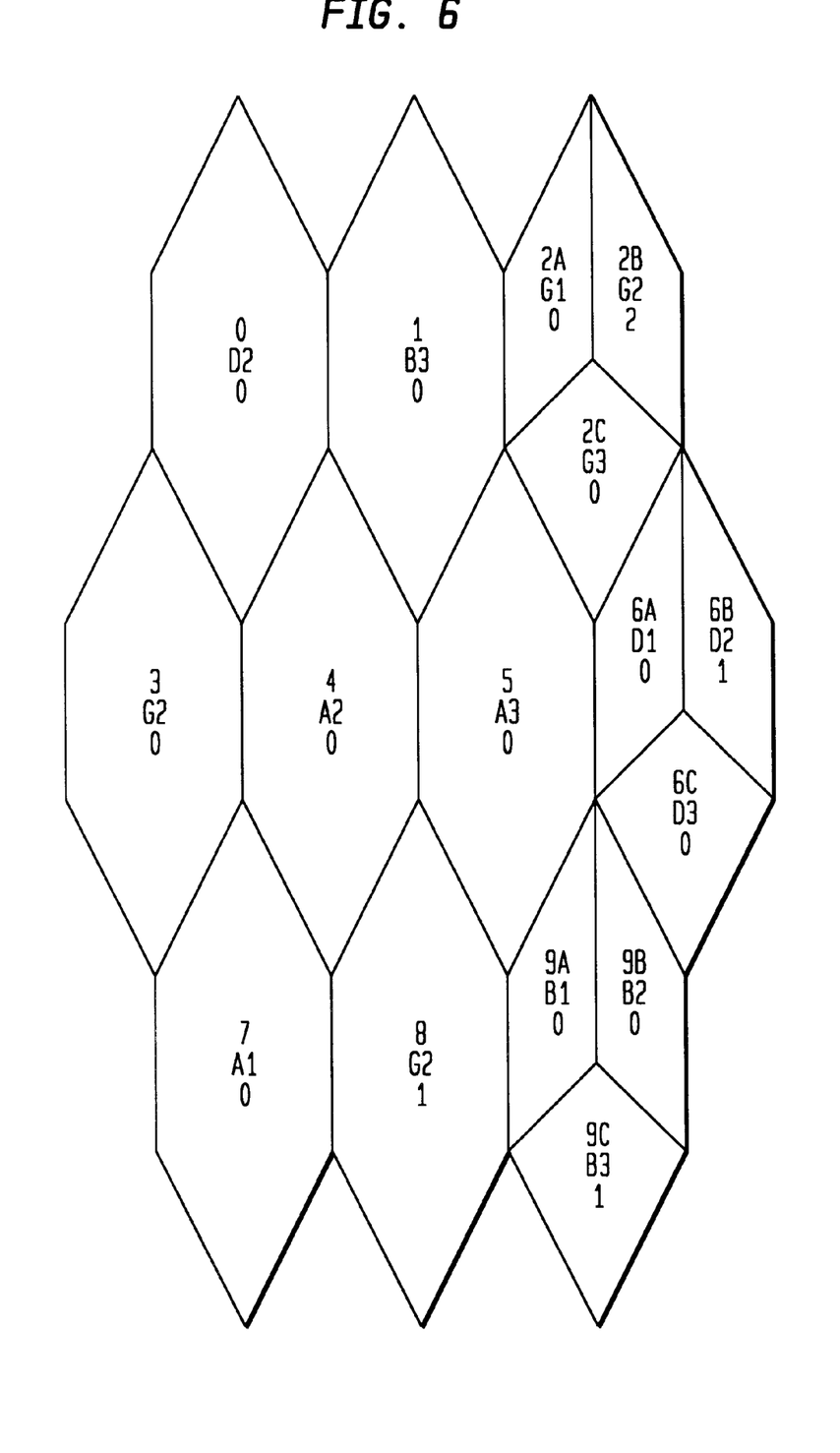
FIG. 6 is a graphic depiction of the result of the exemplary application of the method of FIG. 4.

FIG. 4 is a flowchart illustrating automatic assignment of serving cell codes, wherein a GCC is an example of a serving cell code. Software for assigning GCCs is stored in storage 28 and loaded into memory 30 by processor 24 so as to configure processor 24 to automatically assign GCCs. FIGS. 5A and 5B, read together, show data structures used in the exemplary automatic assignment of serving cell codes discussed below. FIG. 6 is a graphic depiction of the result of the exemplary assignment discussed below.

At step S102, processor 24 determines a value for "N", the number of channel groups, which is seen to be "21" from FIG. 2, and "NCODES", the number of group color codes available to be assigned, which is "32" in CDPD, as defined in "Cellular Digital Packet Data System Specification," Release 1.0, Jul. 19, 1993. After step S102, N=21 and NCODES=32.

At steps S104 and S106, processor 24 initializes various parameters.

An array GROUP(I), with I ranging from 1 to N, comprises a counter for each channel group, used to count the number of times the channel group is used in the serving cells being considered by processor 24. In the embodiment being described, the value of the counter is used as the serving cell code, i.e., the GCC assigned to a serving cell will be the current value of the counter for the channel group associated with the serving cell.

A variable TEMP_CELL_COUNT is used to keep track of how many serving cells have been assigned serving cell codes. When all of the serving cells have been assigned serving cell codes, processor 24 is finished with its automatic assignment of serving cell codes.

A file OUTFILE is used to hold the serving cells and their assigned serving cell codes.

Arrays XARRAY and X1ARRAY are used to determine the neighboring cells of the just-assigned serving cell, so that serving cell codes are assigned in an order of generally increasing distance from an initial serving cell, which may be arbitrarily chosen, herein serving cell 0. As will be appreciated, since the serving cell codes, i.e., the values of the GROUP(I) counters, are increased, the serving cell codes are generally based on the distance between the initially assigned serving cell and subsequently assigned serving cells sharing the channel group of the initially assigned serving cell.

After step S106, the values of the above-described parameters are as shown in the first column of FIG. 5A.

Determination of the serving cell code for serving cell 0 will now be described.

At step 108, processor 24 determines that there is only one serving cell, specifically, serving cell 0, in XARRAY.

At step 110, processor 24 checks whether all of the serving cells have been assigned serving cell codes. The result is a determination of "NO", so processor 24 proceeds to step S114.

At step S114, processor 24 reads the table shown in FIG. 3 from storage 28 into memory 30, and obtains the record for serving cell 0 to find the channel group associated with serving cell 0, herein "D2". Then processor 24 reads the table shown in FIG. 2 from storage 28 into memory 30, and obtains the record for channel group D2 to find the numerical value associated with the channel group, herein "11".

At step S116, processor 24 assigns a serving cell code to serving cell 0. The serving cell code is the value of the counter GROUP(11) MODULO NCODES, that is, 0 MODULO 32, which is 0. It will be recalled that the MODULO function removes the modulus, herein 32, from the argument, herein 0, as many times as is possible before a negative number results. The purpose of the MODULO function is to ensure that the assigned serving cell codes are within the predefined range of eligible serving cell codes. In practice, after a specific GROUP(I) counter attains the largest possible serving cell code value, the MODULO function causes the next value of the GROUP(I) counter to be 0, i.e., the count "rolls over".

At step S118, processor 24 writes the serving cell and its assigned serving cell code to OUTFILE in memory 30. In this example, the serving cell is "0" and its assigned serving cell code is "0", so a record (0,0) is written to OUTFILE.

At step S120, processor 24 increments the counter GROUP(11) by one, to indicate that the associated channel group has been used once. Processor 24 also increments TEMP_CELL_COUNT to indicate that it has assigned a serving cell code to another serving cell.

Since there are no additional serving cells in XARRAY, processor 24 proceeds from step S108 to step S122.

At step S122, processor 24 reads, for each serving cell in XARRAY, its neighboring cells from the table of FIG. 3 into X1ARRAY. At this point, serving cell 0 is the sole entry in XARRAY. After step S122, X1ARRAY is (1, 3, 4).

At step S124, processor 24 eliminates previously assigned serving cells and duplicate serving cells from X1ARRAY. At this time, nothing is eliminated from X1ARRAY.

At step S126, processor sets XARRAY to be the remaining cells in X1ARRAY. After step S126, XARRAY is (1, 3, 4). The second column of FIG. 5A shows the values of the various parameters at this time.

Determination of the serving cell codes for the immediately neighboring serving cells of the serving cell 0, also referred to as first generation serving cells, will now be described.

After step S126, processor 24 proceeds to step S106 and clears X1ARRAY.

At step S108, processor 24 determines that there are three (3) serving cells in XARRAY, and, for each of the serving cells, specifically, cell 1, cell 3 and cell 4, processor 24 executes steps S110, S114, S116, S118 and S120 as generally described above. By referring to FIG. 3, it will be appreciated that the channel groups for cells 1, 3, 4 are B3, G2, A2, respectively. From FIG. 2, it is seen that these channel groups correspond to numerical values 6, 20, 2, respectively. Thus, at the conclusion of this execution of step S108, serving cells 0, 1, 3, 4 have each been assigned serving cell codes of 0 since there has been no channel group re-use. The corresponding counters GROUP(11), GROUP (6), GROUP(20) and GROUP(2) each have a value of one, since the associated channel groups have been used once.

At step S122, processor 24 reads, for each serving cell in XARRAY, its neighboring cells from the table of FIG. 3 into X1ARRAY. At this point, XARRAY includes (1, 3, 4). After step S122, X1ARRAY is a concatenation of the neighboring serving cells for serving cells 1, 3, 4, as shown in TABLE 1.

TABLE 1

| 0 | 2A | 2C | 4 | 5 | 0 | 4 | 7 | 0 | 1 | 5 | 8 | 7 | 3 |
|---|----|----|---|---|---|---|---|---|---|---|---|---|---|

At step S124, processor 24 eliminates serving cells from X1ARRAY that are in XARRAY, namely serving cells 1, 3, 4, so that X1ARRAY is as shown in TABLE 2.

TABLE 2

| 0 | 2A | 2C | 5 | 0 | 7 | 0 | 5 | 8 | 7 |
|---|----|----|---|---|---|---|---|---|---|

Also at step S124, processor 24 eliminates serving cells from X1ARRAY that are in OUTFILE. At this point, only serving cell 0 is in OUTFILE, and X1ARRAY is as shown in TABLE 3.

TABLE 3

| 2A | 2C | 5 | 7 | 5 | 8 | 7 |
|----|----|---|---|---|---|---|

Finally, at step S124, processor 24 eliminates duplicate serving cells from X1ARRAY, so that X1ARRAY is as shown in TABLE 4.

TABLE 4

| 2A | 2C | 5 | 7 | 8 |
|----|----|---|---|---|

At step S126, processor sets XARRAY to be the remaining cells in X1ARRAY. After step S126, XARRAY is (2A, 2C, 5, 7, 8). The second column of FIG. 5A shows the values of the various parameters at this time, except that X1ARRAY is shown after step S122.

Determination of the serving cell codes for the next-to-neighboring serving cells of the serving cell 0, also referred to as second generation serving cells, which are the immediately neighboring serving cells of the immediately neighboring serving cells of serving cell 0, will now be described.

After step S126, processor 24 proceeds to step S106 and clears X1ARRAY.

At step S108, processor 24 determines that there are five (5) serving cells in XARRAY, and, for each of the serving cells, processor 24 executes steps S110, S114, S116, S118 and S120 as generally described above. By referring to FIG. 3, it will be appreciated that the channel groups for cells 2A, 2C, 5, 7, 8 are G1, G3, A3, A1, G2, respectively. From FIG. 2, it is seen that these channel groups correspond to numerical values 19, 21, 3, 1, 20, respectively.

At the conclusion of this execution of step S108, serving cells 2A, 2C, 5, 7, have each been newly assigned serving cell codes of 0 since there has been no channel group re-use among these serving cells or previously processed serving cells. The corresponding counters GROUP(19), GROUP (21), GROUP(3) and GROUP(1) each have a value of one, since the associated channel groups have been used once.

However, serving cell 8 has been assigned a serving cell code of 1 since its channel group was previously used in serving cell 3. Its corresponding counter GROUP(20) has been incremented to a value of two.

At step S122, processor 24 reads, for each serving cell in XARRAY, its neighboring cells from the table of FIG. 3 into X1ARRAY. At this point, XARRAY includes (2A, 2C, 5, 7, 8). After step S122, X1ARRAY is a concatenation of the neighboring serving cells for these serving cells 1, 3, 4, specifically:

| 1, 2B, 2C, 5, |
| 2A, 2B, 6A, 6B, 1, 5, |
| 1, 2A, 2C, 6A, 6C, 9B, 9A, 8, 4, |
| 3, 4, 8, |
| 7, 4, 5, 9A, 9C |

At step S124, processor 24 eliminates previously assigned serving cells and duplicate serving cells from X1ARRAY. After step S124, X1ARRAY includes (2B, 6A, 6B, 6C, 9B, 9A, 9C).

At step S126, processor sets XARRAY to be the remaining cells in X1ARRAY. The third column of FIG. 5A shows the values of the various parameters at this time, except that X1ARRAY is shown after step S122.

Determination of the serving cell codes for the next-to-next-to-neighboring serving cells of serving cell 0, also referred to as third generation serving cells, which are the immediately neighboring serving cells of the next-to-neighboring serving cells of serving cell 0, will now be described.

After step S126, processor 24 proceeds to step S106 and clears X1ARRAY.

At step S108, processor 24 determines that there are seven (7) serving cells in XARRAY, and, for each of the serving cells, processor 24 executes steps S110, S114, S116, S118 and S120 as generally described above. By referring to FIG. 3, it will be appreciated that the channel groups for cells 2B, 6A, 6B, 6C, 9B, 9A, 9C are G2, D1, D2, D3, B2, B1, B3, respectively. From FIG. 2, it is seen that these channel groups correspond to numerical values 20, 10, 11, 12, 5, 4, 6, respectively.

At the conclusion of this execution of step S108, serving cells 6A, 6C, 9B, 9A, have each been newly assigned serving cell codes of 0 since there has been no channel group re-use among these serving cells or previously processed serving cells. The corresponding counters GROUP(10), GROUP(12), GROUP(5) and GROUP(4) each have a value of one, since the associated channel groups have been used once.

Serving cells 6B, 9C have been assigned a serving cell code of 1 since their respective channel group was previously used in another serving cell, specifically, serving cells 0, 1, respectively. The corresponding counters GROUP(11) and GROUP(6) have been incremented to a value of two.

Serving cell 2B has been assigned a serving cell code of 2 since its channel group was previously used in two other serving cells, specifically, serving cells 3 and 8. The corresponding counter GROUP(20) has been incremented to a value of three.

As can be seen from FIG. 6, serving cells 3, 8 and 2B share channel group G2. Initially, serving cell 3 was assigned a group color code of "0". The next closest serving cell, serving cell 8, was assigned a group color code of "1". The subsequently located serving cell, serving cell 2B, was assigned a group color code of "2".

As shown in FIG. 4, at step S122, the neighbor cells for the cells in XARRAY are determined, at step S124, previously processed and duplicate cells are eliminated, and at step S126, XARRAY is set to the remaining cells. At step S106, X1ARRAY is cleared, and then, at step S108, for the first serving cell in XARRAY, TEMP_CELL_COUNT is equal to the number of serving cells. Processor 24 takes the "YES" branch from step S110 to step S112, and processing is completed.

FIG. 5B shows the contents of OUTFILE and the values of the counters in the GROUP(I) array when processor 24 is finished.

FIG. 6 shows the GCCs assigned to each of the representative cells 0–9 in the communication network 12.

In another embodiment, instead of processor 24 executing assignment software loaded from storage 28 to memory 30, server 200 executes assignment software as generally depicted in FIG. 2. Server 200, which comprises a general purpose processor, storage and communication facilities, receives information such as shown in FIGS. 2 and 3 from MSC 10, and supplies a resulting OUTFILE to MSC 10, via PSTN 22or another appropriate communications facility. An advantage of having server 200 perform assignment, rather than each MSC, is that assignment for cells at the boundary of a particular MSC can be more readily coordinated with a neighboring MSC.

Figure 7:
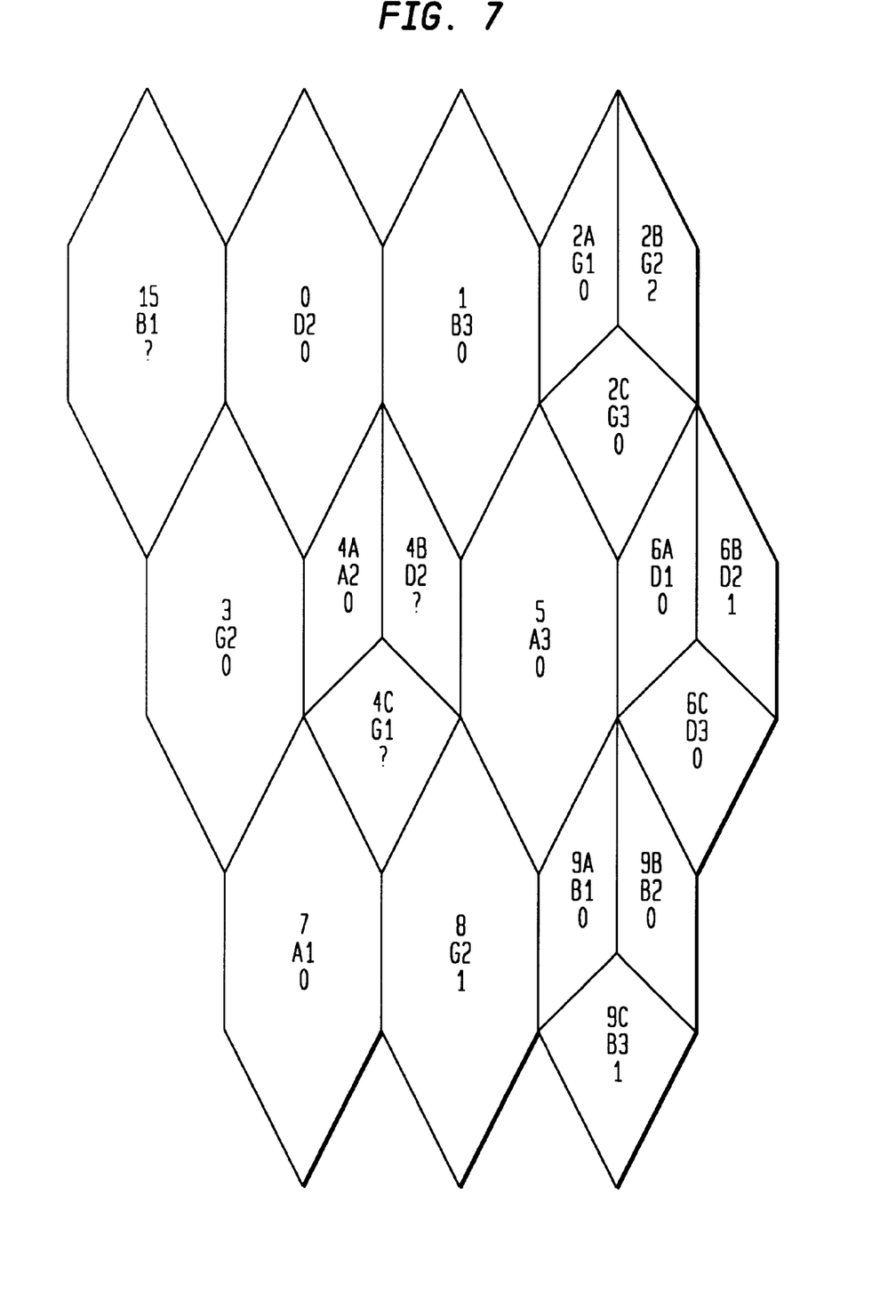
FIG. 7 is a diagram showing the serving cells of FIG. 6 with the addition of new serving cells.

After the serving cells in communication network 12 have been assigned serving cell codes, growth may require the addition of one or more new serving cells via addition of an omni-cell, addition of a sectored cell, or division of an omni-cell into a sectored cell. FIG. 7 shows the cells of FIG. 6 but with a new omni-cell, serving cell 15, and a new sectored cell, formerly serving cell 4, which has been split into serving cells 4A, 4B, 4C. Serving cell 4A assumes the channel group and serving cell code formerly assigned to serving cell 4, namely, channel group A2 and serving cell code 0. Serving cells 15, 4B, 4C have been assigned channel groups B1, D2, G1, respectively, for purposes of this example.

In assigning serving cell codes to serving cells 15, 4B, 4C, it is desirable to minimize the changes to the serving cell codes assigned to the rest of communication network 12, to simplify operations and so that the reassignment process is as efficient as possible. Three techniques for automatically assigning a new serving cell code to a new serving cell are described below.

In the first technique, processor 24 at MSC 10, or a similar processor at server 200, starts with the new serving cell, finds its nearest neighbor serving cells using the information as shown, e.g., in FIG. 3, then finds the neighbors of the nearest neighbor serving cells (the second generation neighbors), then finds the neighbors of the second generation neighbors (the third generation neighbors), and so on for a number of generations, such as five generations. It will be appreciated that the remoteness of the neighboring serving cells relative to the new serving cells is increasing at each repetition of neighbor-finding. Then, processor 24 selects those of the neighboring serving cells of the number of generations which share the channel group of the new serving cell, and determines the serving cell codes previously assigned to the co-channel neighboring serving cells. Processor 24 assigns a new serving cell code to the new serving cell which is other than one of the previously assigned serving cell codes, ensuring that the new serving cell code is unique for that channel group within the number of generations of neighbors.

If the assignment of a unique serving cell code is not possible, processor 24 deletes the most recent generation of neighboring serving cells, i.e., essentially backs out of its most recent iteration, until the new serving cell can be assigned a serving cell code which is different than the serving cell codes assigned to the remaining neighboring serving cells.

If the set of neighboring serving cells sharing the channel group associated with the new serving cell is empty after the predetermined number of generations of neighboring serving cells have been located, indicating that the channel group of the new serving cell is not used among the neighbors of the new serving cell, processor 24 assigns a new serving cell code to the new serving cell.

In the second technique, instead of repeating the step of neighbor-finding for a number of generations, as described above, the step of neighbor-finding is repeated until at least a number of serving cells sharing the channel group associated with the new serving cell are obtained. The number of serving cells may be a particular number, e.g., 5 or 7, or may be a number which depends on the number of available serving cell codes (NCODES in FIG. 4), such as 0.2 * NCODES. Then, processor 24 selects a new serving cell code for the new serving cell which is different than the serving cell codes of the set of neighboring serving cells sharing the channel group associated with the new serving cell.

In the third technique, such as one where the number of available serving cell codes is small (e.g., 10), processor 24 does not perform neighbor-finding as described above. Instead, processor 24 finds all of the serving cells sharing the channel group associated with the new serving cell from FIG. 3, picks one of the co-channel serving cells as an initial serving cell, and assigns serving cell codes to each of the co-channel serving cells based on the distance from the initial serving cell. Specifically, after the initial serving cell is determined and a serving cell code is assigned thereto, processor 24 finds its first generation neighboring co-channel serving cells, assigns serving cell codes thereto by a procedure such as steps S116–S120 of FIG. 4, described above, and then finds the second generation neighboring co-channel serving cells of the initial serving cell by a procedure such as steps S122–S126 of FIG. 4, and so on until all of the neighboring co-channel serving cells have been assigned serving cell codes.

In certain embodiments, serving cell codes for all serving cells are reassigned from time to time because of the addition of new serving cells to the system. The frequency of reassignment is selected based upon factors such as the total number of serving cells in the system, the number of serving cell codes available, and the number of channel groups used in the system. As an example, where there are 32 group color codes and 21 channel groups being used in a system where a new serving cell is typically added once every three or four months, the serving cell codes for all serving cells are reassigned whenever five new serving cells have been added to the system. As a guideline, however, the reassignment of serving cell codes for all serving cells should be done at least annually for a growing system, i.e., a system wherein the ratio (number of new serving cells per year)/NCODES is at least 10%.

Although illustrative preferred embodiments have been described herein in detail, it will be appreciated by those skilled in the art that numerous variations may be made within the scope of this invention and without sacrificing its advantages. For instance, the present invention is not limited to assigning group color codes and is equally applicable to assigning supervisory audio tones ("SAT") in cellular voice. The terms and expressions have been used herein as terns of description and not terms of limitation. There is no intention to use the terms or expressions to exclude any equivalents of features shown and described or portions thereof and this invention should be defined in accordance with the claims which follow.

What is claimed is:

1. A method for assigning serving cell codes to serving cells in a communication network to distinguish among serving cells having the same associated channel group, comprising the steps of:
   reading from a memory an associated channel group for one of the serving cells; and
   automatically assigning one of the serving cell codes to the one serving cell based on the channel group associated with the one serving cell.

2. The method of claim 1, further comprising the steps of:
   reading from the memory an associated channel group for a next serving cell; and
   automatically assigning one of the serving cell codes to the next serving cell based on the channel groups associated with the next serving cell and the one serving cell.

3. The method of claim 1, further comprising the step of automatically assigning selected serving cell codes to subsequent serving cells sharing the channel group associated with the one serving cell so that the selected serving cell codes are generally based on the distance from the subsequent serving cells to the one serving cell.

4. The method of claim 1, wherein each of the serving cells has an associated channel group, and each of the channel groups has an associated counter, and further comprising the step of incrementing the counter for a specific one of the channel groups after one of the serving cells associated with the specific channel group has been assigned a serving cell code.

5. The method of claim 4, wherein the assigned serving cell code is the value of the counter for the associated channel group at the time of the serving cell code assignment.

6. The method of claim 5, further comprising the step of obtaining a modulo value of the counter, the modulus being the number of available serving cell codes.

7. The method of claim 1, wherein the step of automatically assigning is performed when a frequency plan changes.

8. The method of claim 1, wherein the step of automatically assigning is performed at a cellular switch.

9. The method of claim 1, wherein the step of automatically assigning is performed at a server located at a location other than a cellular switch.

10. The method of claim 1, wherein the serving cell codes are group color codes.

11. The method of claim 1, wherein the serving cell codes are supervisory audio tones.

12. An apparatus for assigning serving cell codes to serving cells in a communication network to distinguish among serving cells having the same associated channel group, comprising:
    a memory for storing an associated channel group for one of the serving cells; and
    a processor for automatically assigning one of the serving cell codes to the one serving cell based on the stored channel group associated with the one serving cell.

13. The apparatus of claim 12, wherein:
    the memory is also for storing an associated channel group for a next serving cell; and
    the processor is also for automatically assigning one of the serving cell codes to the next serving cell based on the channel groups associated with the next serving cell and the one serving cell.

14. The apparatus of claim 12, wherein the processor is also operative to automatically assign selected serving cell codes to subsequent serving cells sharing the channel group associated with the one serving cell so that the selected serving cell codes are generally based on the distance from the subsequent serving cells to the one serving cell.

15. The apparatus of claim 12, wherein each of the serving cells has an associated channel group, and each of the channel groups has an associated counter, and wherein the processor is also operative to increment the counter for a specific one of the channel groups after one of the serving cells associated with the specific channel group has been assigned a serving cell code.

16. The apparatus of claim 15, wherein the assigned serving cell code is the value of the counter for the associated channel group at the time of the serving cell code assignment.

17. The apparatus of claim 16, wherein the processor is also operative to obtain a modulo value of the counter, the modulus being the number of available serving cell codes.

18. The apparatus of claim 12, wherein the processor is operative to automatically assign the serving cell code when a frequency plan changes.

19. The apparatus of claim 12, wherein the processor is at a cellular switch.

20. The apparatus of claim 12, wherein the processor is at a server located at a location other than a cellular switch.

21. The apparatus of claim 12, wherein the serving cell codes are group color codes.

22. The apparatus of claim 12, wherein the serving cell codes are supervisory audio tones.

23. A method for assigning a new serving cell code to a new serving cell having an associated channel group in a communication network having existing serving cells with previously assigned associated channel groups and serving cell codes to distinguish among serving cells having the same associated channel group, comprising the steps of:

reading from a memory the existing serving cells sharing the channel group associated with the new serving cell; and automatically assigning the new serving cell code to the new serving cell based on the previously assigned serving cell codes for the existing serving cells sharing the channel group associated with the new serving cell.

24. The method of claim 23, wherein the step of reading includes the steps of locating neighboring serving cells of the new serving cell, and selecting those of the neighboring serving cells sharing the channel group associated with the new serving cell.

25. The method of claim 24, wherein the step of locating is repeated for a number of times, the remoteness of the neighboring serving cells relative to the new serving cells increasing at each repetition of the step of locating.

26. The method of claim 23, wherein the step of reading reads a number of the existing serving cells sharing the channel group associated with the new serving cell.

27. The method of claim 26, wherein the number is based on a total number of available serving cell codes.

28. The method of claim 23, wherein the step of reading reads all of the existing serving cells sharing the channel group associated with the new serving cell.

29. The method of claim 28, further comprising the step of automatically reassigning serving cell codes to selected ones of the existing serving cells sharing the channel group associated with the new serving cell.

30. The method of claim 23, further comprising the step of automatically assigning serving cell codes to the existing serving cells in the communication network after a number of new serving cells have been added since a previous assignment of serving cell codes to the then existing serving cells in the communication network.

31. An apparatus for assigning a new serving cell code to a new serving cell having an associated channel group in a communication network having existing serving cells with previously assigned associated channel groups and serving cell codes to distinguish among serving cells having the same associated channel group, comprising:

a memory for storing the existing serving cells sharing the channel group associated with the new serving cell; and a processor for automatically assigning the new serving cell code to the new serving cell based on the previously assigned serving cell codes for the existing serving cells sharing the channel group associated with the new serving cell.

32. The apparatus of claim 31, wherein the processor is also operative for finding neighbor serving cells of said new serving cell, selecting the neighbor serving cells sharing the channel group associated with the new serving cell, and repeating the step of locating for a number of times, the remoteness of the neighboring serving cells relative to the new serving cell increasing at each repetition of the step of locating.

33. The apparatus of claim 31, wherein the processor is also operative for locating a selected number of the existing serving cells sharing the channel group associated with the new serving cell.

34. The apparatus of claim 33, wherein the selected number is based on a total number of available serving cell codes.

35. The apparatus of claim 33, wherein the processor is also operative for selecting a new serving cell code for the new serving cell which is different than the serving cell codes of the existing serving cells sharing the channel group associated with the new serving cell.

36. The apparatus of claim 33, wherein the processor is operative to locate the selected number of the existing serving cells by finding neighbor serving cells of said new serving cell, selecting the neighbor serving cells sharing the channel group associated with the new serving cell, and repeating the step of finding for a number of times, the remoteness of the neighboring serving cells relative to the new serving cell increasing at each repetition of the step of locating.

37. An apparatus for assigning a new serving cell code to a new serving cell having an associated channel group in a communication network having existing serving cells with previously assigned associated channel groups and serving cell codes to distinguish among serving cells having the same associated channel group, comprising:

a memory for storing the existing serving cells sharing the channel group associated with the new serving cell; and a processor for locating all of the existing serving cells sharing the channel group associated with the new serving cell, selecting one of the existing serving cells sharing the channel group associated with the new serving cell, and reassigning the serving cell codes of each of the other existing serving cells based on their respective distances from the selected one of the existing serving cells while omitting reassigning of serving cell codes for existing serving cells having an associated channel group other than the channel group associated with the new serving cell.

* * * * *